(No Model.)
J. J. HAYES.
CULINARY IMPLEMENT.
No. 536,521.  Patented Mar. 26, 1895.
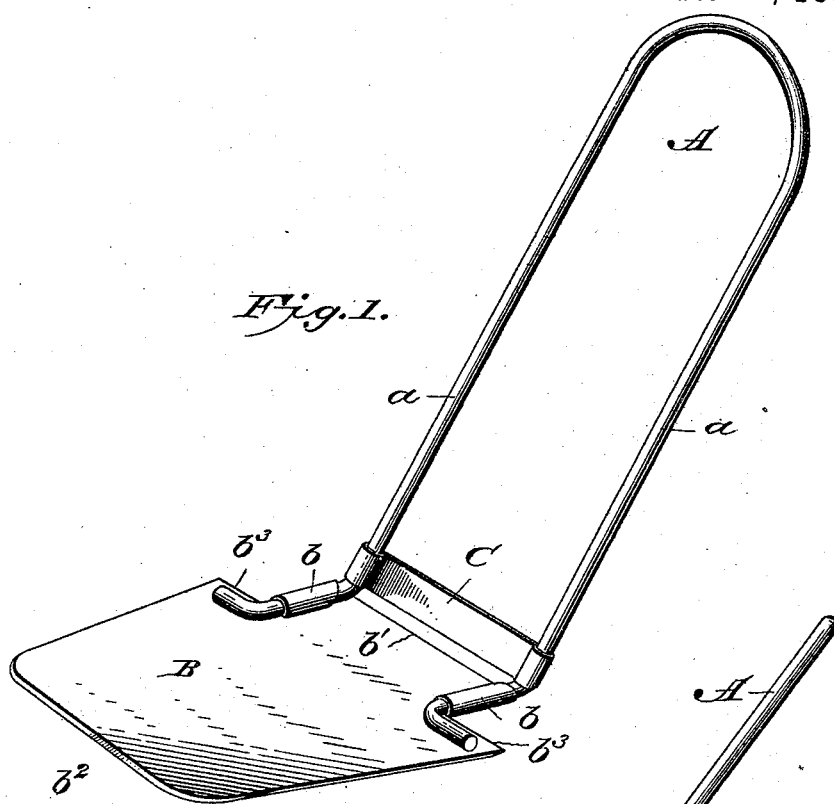
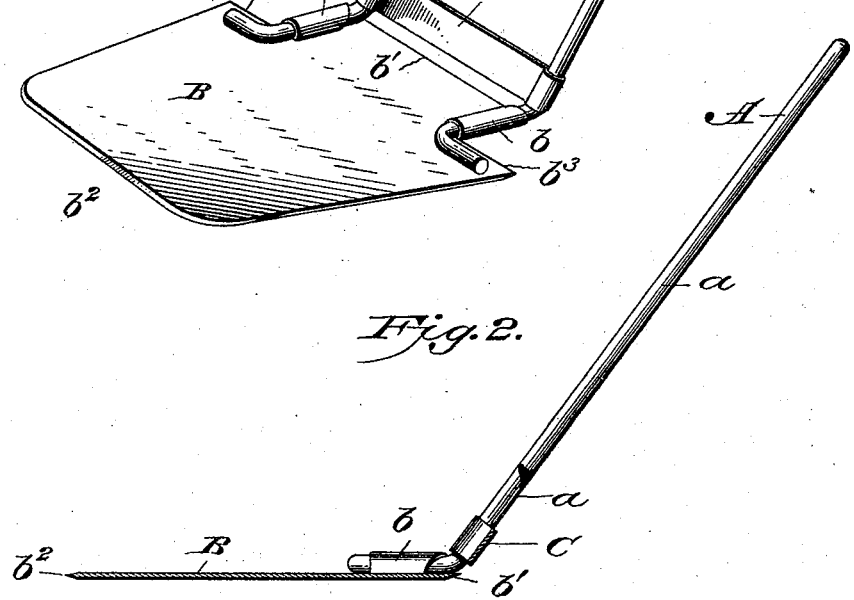
James J. Hayes
INVENTOR
WITNESSES
L. S. Elliott,
E. W. Johnson
Attorney

UNITED STATES PATENT OFFICE.

JAMES J. HAYES, OF KANKAKEE, ASSIGNOR TO HENRY M. REYNOLDS AND LOUIS H. SCHMERTMAN, OF CHICAGO, ILLINOIS.

CULINARY IMPLEMENT.

SPECIFICATION forming part of Letters Patent No. 536,521, dated March 26, 1895.

Application filed January 2, 1895. Serial No. 533,592. (No model.)

*To all whom it may concern:*

Be it known that I, JAMES J. HAYES, a citizen of the United States of America, residing at Kankakee, in the county of Kankakee and State of Illinois, have invented certain new and useful Improvements in Culinary Implements; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my invention is to provide an implement which can be used as a meat chopper, fruit and potato parer and slicer; the invention consisting in the special construction and combination of the parts thereof, as will be hereinafter fully set forth and particularly pointed out in the claim.

In the accompanying drawings, forming part of this specification, Figure 1 is a perspective view of the device, and Fig. 2 is a side view, partly in section.

A designates the handle which is made up of a single piece of wire bent to provide side members $a\ a$ the free ends of which are bent at an obtuse angle and then outwardly, as shown. To the bent ends of the side members of the handle is attached a blade B of sheet metal and preferably of the shape shown. In forming the blade B it is provided with slits or cuts which present portions $b$ adapted to be bent over the ends of the handle to secure the blade thereto. The blade is provided with cutting edges $b'$, $b^2$ and $b^3$ for the purposes hereinafter set forth.

C designates a cross-piece or strip which is secured to the members $a\ a$ of the handle by bending the ends of the strip around the same, and this plate may be movable upon the handle if desired so that the position of the same with regard to the cutting-edge $b'$ of the blade may be varied.

The hereinbefore described device is simple in construction, and may be used as a meat chopper and when so used the edge $b^2$ does the cutting. In paring fruit or potatoes the cutting edge $b'$ is used and the cross-piece serves as a gage, the thickness of the parings being determined by the position of the cross-piece with respect to the cutting edge. When it is desired to remove eyes from potatoes, or cut into fruit, the cutting edges $b^3$ may be used for such purposes. The device can also be used as a scraper or slicer, as well as a cake-turner.

The implement hereinbefore described can be cheaply manufactured, and the parts are so connected that they cannot become displaced.

Having thus described my invention, what I claim as new, and desire to secure by Letters Patent, is—

In a culinary implement, the combination, of a wire handle A looped to form side members $a\ a$ the free ends of which are bent at an obtuse angle and then outwardly, a plate or blade having cutting edges and portions which embrace the bent ends of the handle, and a cross-piece or strip C held in looped engagement with the side members of the handle, substantially as shown and for the purpose set forth.

In testimony whereof I affix my signature in presence of two witnesses.

JAMES J. HAYES.

Witnesses:
 HENRY M. REYNOLDS,
 LON E. REYNOLDS.